S. P. SMITH.
AUTOMATIC AIR CURRENT GOVERNOR.
APPLICATION FILED APR. 30, 1907.

947,166.

Patented Jan. 18, 1910.

UNITED STATES PATENT OFFICE.

SOLOMON P. SMITH, OF DENVER, COLORADO, ASSIGNOR TO FUEL SAVING COMPANY, OF UTICA, NEW YORK, A CORPORATION OF NEW YORK.

AUTOMATIC AIR-CURRENT GOVERNOR.

947,166.  Specification of Letters Patent.  Patented Jan. 18, 1910.

Application filed April 30, 1907. Serial No. 371,096.

*To all whom it may concern:*

Be it known that I, SOLOMON P. SMITH, citizen of the United States, residing at Denver, in the county of Denver and State of Colorado, have invented certain new and useful Improvements in Automatic Air-Current Governors, of which the following is a specification, reference being had therein to the accompanying drawing.

My invention relates to automatic devices for securing a uniform flow of air in ducts, such as air flues for furnaces, and includes means for varying by suitable adjustments, the normal flow of air, and the quickness of action of the automatic valve. The duct is provided with a swinging valve plate which automatically varies in inclination giving at all times the proper volume of air.

Figure 1:
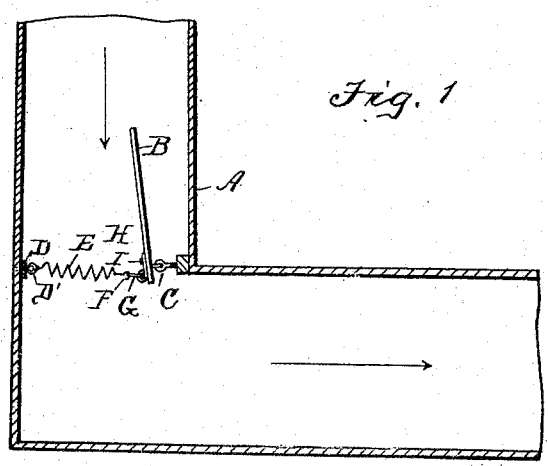
Figure 2:
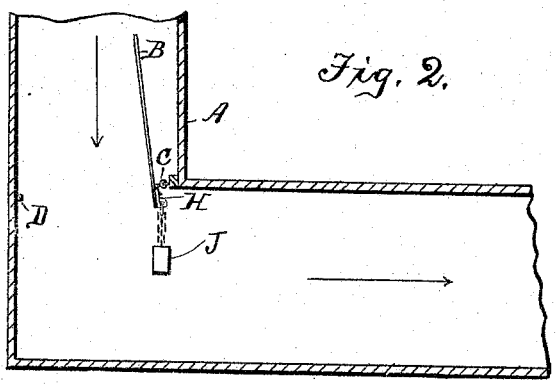
Figure 3:
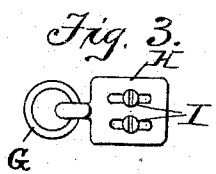

In the accompanying drawings: Figure 1 is a vertical longitudinal section of an air duct having a vertical portion provided with my devices. Fig. 2 is a view similar to Fig. 1 showing the use of a weight instead of a spring to control the action of a certain valve. Fig. 3 shows an adjustable device for attaching the weight or spring to the valve.

In these figures, A represents a duct provided with a valve B hinged at C and capable of closing against a stop D, a spring E offering yielding resistance to the closing movement and restoring the valve to its normal position when the closing force ceases to act. The hinge is here shown as consisting of screw eyes and for illustration one end of the spring is shown as attached to the stop D by a screw eye D' permitting adjustment of tension, while the other end is adjustably connected to the valve at a point nearly opposite the hinge axis. This connection may be by means of a hook F, link G, slotted plate H, and screw I, Fig. 3, the slots permitting the plate to be readily moved toward or from the horizontal plane of the hinge axis.

When the proper amount of air is passing the valve, the latter will remain very slightly inclined to the axis of the duct, but any material increase in the velocity of the air current will swing the valve toward its closed position thus automatically lessening the cross section of the stream of air and practically delivering the same amount as before. A very rapid or violent current of air may even momentarily close the valve, but with the devices properly proportioned the amount of air passing the valve is constant, the valve being very sensitive and responding instantly to slight variations of the current. Obviously the amount of air normally passing is fixed by adjusting the normal inclination of the valve.

The device may be used in a horizontal flue by turning the section of the flue which contains the operating devices 90 degrees to the left, or may be placed in a vertical flue with an upward air current if first revolved 180 degrees. The valve is shown near an elbow in the pipe but this location is immaterial to the operativeness of these devices.

Fig. 2 illustrates the use of a weight J instead of the spring E. The spring construction is preferable since it is cheaper, more readily adjusted, removed, or replaced, and noiseless this latter point being very important.

If at any time the air current exceeds its normal velocity, for which the governor has been adjusted, the valve swings to a degree corresponding to the velocity, and hence the volume of air passing at the higher velocity is substantially the same as the volume passing at normal velocity. Obviously the valve being a light plate urged to swing only by a slight fraction of its own weight, and this slight force being balanced by a correspondingly slight yielding resistance, the valve in normal position is extremely sensitive to variations in the air current.

Obviously, the construction is not limited to the single spring shown, a heavier plate requiring greater spring resistance.

What I claim is:

1. The combination with a rectangular vertical air duct, of a valve plate of corresponding shape within the duct, normally slightly inclined from vertical position and pivoted near its lower margin to swing freely upon a transverse axis, devices attached to the plate below its axis and adapted to offer yielding resistance to its swinging, and means for adjusting the distance of the point of attachment from said axis.

2. The combination with an air duct, of an automatic current governor located within the duct and consisting of a valve normally slightly inclined to the direction of the air current and pivoted to the walls of the duct to swing upon an axis near that margin of the plate most distant from the origin of the current, a spring attached to the plate at a point upon the same side of the axis as said margin and connecting it to the wall of the duct, means for adjusting the tension of the spring, and means for adjusting the distance of said point from said axis.

In testimony whereof I affix my signature in presence of two witnesses.

SOLOMON P. SMITH.

Witnesses:
FRED. O. POTTER,
GEORGE A. STAHL.